July 6, 1937.   F. E. HAMILTON   2,086,129
MIXING VALVE
Filed March 19, 1935
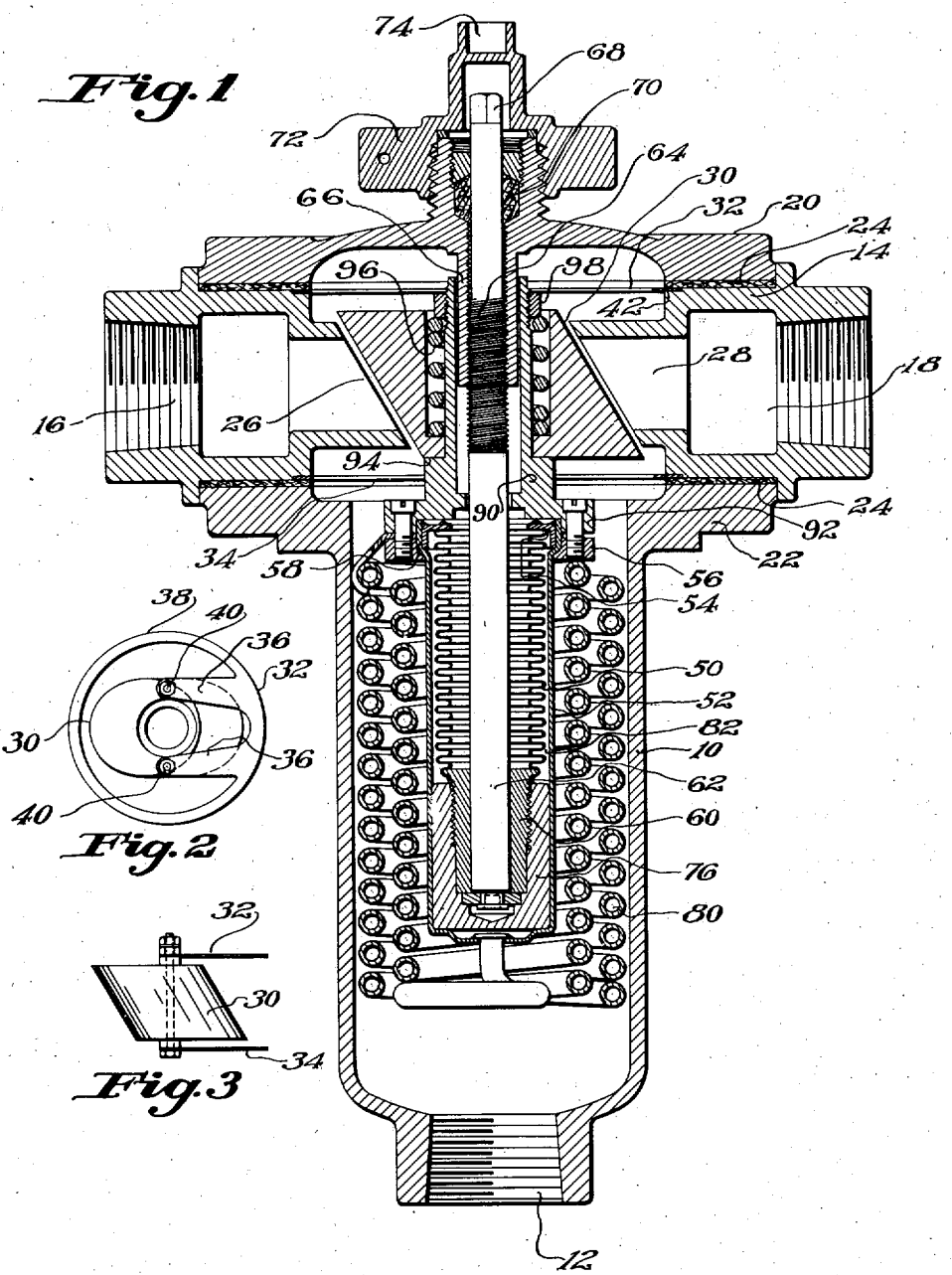
Witness
Paul F. Bryant
Inventor
Frank E. Hamilton
by his Attorneys
Fish Hildreth Cary & Jenney Patented July 6, 1937

2,086,129

UNITED STATES PATENT OFFICE 2,086,129

MIXING VALVE

Frank E. Hamilton, Scarsdale, N. Y.

Application March 19, 1935, Serial No. 11,837

10 Claims. (Cl. 236—12)

The present invention relates to a new and improved type of valve particularly adapted for the simultaneous mixing or blending of fluids having dissimilar characteristics. In the embodiment of the valve as illustrated it is employed for thermostatically controlling mixed hot and cold water to produce and maintain a predetermined temperature of the mixture. This is best accomplished by simultaneously varying both the hot and cold water inlets in graduated amounts, and in a manner controlled by the resulting temperature of the mixed water.

In the past suggestions to this end have not been satisfactory either because the valve did not respond with sufficient sensitivity to the attempts made thereon, was caused to vary in its operation by varying pressures of hot or cold water or both, or was faulty in its mechanical operation. Various attempts to overcome the difficulties have been made in the past, certain of these efforts attempting to regulate by metering either the hot or cold water, and others through the employment of a piston or grid valve designed through a sliding action in the valve chamber to cut off the ports to a greater or less extent. All of these prior attempts, however, have invariably failed to produce the desired effect, namely, an accurate control of mixed water temperature independently of pressure which was long-lived and free from interference with its operation either through corrosion or the building up of deposits from the water.

I have devised a valve which is thermostatically controlled from the mixed water temperature, which has all of the advantages of the piston type of valve in its ability to simultaneously and accurately control the flow of both hot and cold water, and which, unlike such valves, does not require tight and accurate fitting within the valve chamber with liability of sticking due to corrosion or build-up of solid deposits. To this end I provide a valve chamber with oppositely disposed hot and cold water ports in which is mounted a plug or piston valve having surfaces in proximity to each of the ports, and designed upon movement of the valve to approach toward and recede from the ports simultaneously. The valve is normally centered with respect to the valve chamber, and does not come in direct contact therewith except on occasion when either one of the ports may be completely closed by movement of the valve.

In a simple and efficient form of the valve, I provide a cylindrical block somewhat smaller than the interior dimensions of the chamber and approximately centered therein. This block is mounted to move in a straight-line path disposed angularly with respect to the longitudinal axis of the cylinder, which may be considered as that axis which extends lengthwise of the valve chamber and generally parallel to the walls. By suitably connecting this valve with a thermostatically controlled unit, it may be shifted bodily in a direction inclined to its axis and caused to approach and recede from the ports, simultaneously and accurately metering the flow of water therethrough. Due to the sidewise or lateral movement of the valve with respect to the walls of the valve chamber as distinguished from the sliding movement of a closely fitting valve within the chamber, the operation is not affected by corrosion or a tendency to building up of solid deposits, particularly as the water issuing from the ports during the operation of the valve is constantly flowing between the valve surface and the walls of the chamber to maintain a scouring action therethrough.

In the accompanying drawing, Fig. 1 represents an elevation in section of a valve embodying the features of the invention; Fig. 2 is a detail illustrating a plan view of the plug valve and resilient support; and Fig. 3 is a detail illustrating an elevation of the supporting structure.

The valve shown in the illustrated embodiment of the invention comprises a housing portion 10 enclosing a mixed water chamber having a mixed water outlet 12 and a thermostatic unit located therein. The lower portion 10 of the housing is surmounted by an inlet 14 having hot and cold water inlets 16 and 18, respectively. Surmounting the inlet section is a cover portion 20, the three sections of the housing being bolted or otherwise secured together through the area determined by the flange 22, sealing gaskets 24 being inserted between the sections for a tight fit. The inlet sections terminate in ports 26 and 28 oppositely directed and providing opposite sides of a circular valve chamber, the faces of the ports being formed on a circular contour to correspond to the contour of a circular valve member 30 positioned therebetween. This valve member, as indicated in the drawing, is normally centered and spaced from the walls of the chamber determined by the two curved ports, the intercepting curved surface of the valve being angularly disposed with respect to its direction of movement.

The valve is normally supported and guided for movement independently of the valve chamber by upper and lower supporting arms 32 and 34, which, as indicated more particularly in Fig. 2, consist in each case of resilient spring arms 36 extending from a ring-shaped base 38 and connected on their free ends 40 to opposite sides of the valve member at top and bottom. The guide assembly, as indicated in Fig. 1, is clamped in each case in a recess 42 formed in the section 14 and serves to not only maintain the valve in centered relation with respect to the ports, but to guide the valve through an approximate parallel motion in a manner to cause the surface to simultaneously approach one port and recede from the other as the valve is moved in either direction.

Although the valve is described and shown as having a circumferential metering surface, it will be obvious that providing the metering surfaces are properly inclined to the direction of movement of the valve, the simultaneous metering effect of both ports will be obtained, even though the valve may be given other cross-sectional shapes.

The thermostatic control of the valve is accomplished essentially through a metallic bellows 50 which is positioned within an enclosing tube 52. The bellows and tube are joined or anchored together at the upper end 54 of the bellows, and the assembly is connected to the valve assembly through a bolted-on ring 56 which engages an enlargement 58 at the upper end of the tube. The lower end of the bellows is retained against movement through connection with an end block 60 mounted upon an adjusting rod 62. The adjusting rod extends longitudinally of the bellows through the valve itself and is threadedly connected at its outer end 64 in a sleeve 66 forming a part of the cover 20. The outer end of the adjusting rod is provided with a square shape at 68 to permit rotation with consequent adjustment of the bellows end connected thereto. The rod short of its operating end passes through a packing gland 70, and is normally closed by a cover nut 72 which has provision in its end 74 for rotation of the rod. Rotation of the rod with adjustment of the lower end of the bellows serves as a manual adjustment for varying the temperature of the mixed water as desired. The block 60 at the lower end of the bellows is threaded into a head 76 which may be hexagonal or non-circular in shape, but which is guided for sliding movement within the enclosing tube 52. Through the provision of the non-circular shape, although the lower end of the bellows is guided within the tube, nevertheless the thermal fluid filling the space between the bellows and tube is allowed to circulate freely past the block 76. The lower end of the tube is in constant free communication with a coil 80, which may be in the form of a double spiral connected with the tube and substantially filling the space between the tube and the housing wall through which mixed water flows.

The coil 80 and the annular space 82 in communication therewith are preferably filled liquidly with a medium which expands and contracts under the influence of temperature to cause movement of the bellows thereby. Inasmuch as the movement of the bellows depends upon liquid expansion rather than vapor pressure, the movement is positive and is not affected by changes in the pressure of the water to be mixed, regardless of whether this pressure is directed against the bellows or the valve operated thereby.

With this construction it will be evident that the lower end of the bellows being fixed except for adjustment to vary temperature, expansion and contraction of the fluid operating to shift the valve actually moves the inner end of the bellows and connected tube 52 with respect to the outer fixed end, and in consequence the valve assembly connected therewith.

Inasmuch as the movement created by expansion and contraction of the fluid is positive, means must be provided for permitting over-travel of the thermostatic unit when the valve seats upon either port without injury to the valve. To this end it will be observed that the valve piston 30 is carried upon a sleeve 90 which is connected directly to the thermostatic assembly through a flange 92. This sleeve loosely surrounds the adjusting rod 62 and is guided entirely by the sustaining spring arms 36 rather than the rod or the surrounding valve chamber. The piston valve, which is hollow, seats upon the sleeve at 94 and is yieldingly maintained by a coil spring 96 received within the valve and interposed between a shouldered portion of the valve and a holding ring 98.

With this construction it will be evident that as expansion of the fluid causes a downward movement of the tube and connected valve assembly, contact of the valve surface with the hot water port still permits continued over-travel of the thermostatic unit and inner sleeve 90 through compression of the spring 96. Obviously this action is necessary in case the thermostatic unit does not instantly respond to the varying temperature of mixed water upon curtailment of hot water supply.

As evident from the drawing, the hot and cold water entering through the ports 26 and 28 flow downwardly around the intercepting valve and into the mixed water chamber, tending to maintain the valve free of deposits or the like which would tend to interfere with its operation. The valve, unlike the usual type of piston valve, is not guided by the walls of the valve chamber within which it slides to cut off ports, but actually approaches and recedes from the ports in its straight-line movement thereacross in a manner to meter the supply through a valve normally out of contact with the valve chamber and guided independently thereof.

Although the valve is described particularly in connection with the mixing of hot and cold water which is to be thermostatically controlled, it should be understood that it has definite advantages in connection with the mixing of either water or other fluids by hand or otherwise, wherever it may be desirable to mix or blend fluids having dissimilar properties.

What is claimed is:—

1. A mixing piston type valve comprising a movable valve member having a plurality of metering surfaces disposed angularly with respect to the direction of movement of the valve member, a stationary fluid port cooperating with each surface and governed in its flow by the proximity of the surface thereto, the ports being designed to deliver fluids of dissimilar characteristics to be mixed, and means for moving the valve member across the ports to cause one surface to approach a port while the complementary surface recedes from the port to simultaneously vary the amount of fluid delivered through each port.

2. A mixing valve comprising a valve chamber having oppositely disposed fluid ports therein, a piston valve movable in the chamber in a direction inclined to its axis to cause movements of the valve to approach and recede from the ports, and means for confining the movement of the valve to an approximate straight-line path.

3. A mixing valve comprising a valve chamber having fluid ports therein, a piston valve movable in the chamber but normally out of contact therewith, means for guiding the movements of the valve in an approximate straight-line path inclined to its longitudinal axis, and means for moving the valve to cause it to approach and recede from the ports in the valve chamber.

4. A mixing valve comprising a valve chamber having hot and cold water ports, a piston valve having a contour corresponding to that of the chamber and with a surface inclined to its direction of movement, means for normally maintaining the valve out of contact with the walls of the valve chamber and for confining the movements of the valve to an approximate straight-line path, and thermostatically controlled means for shifting the position of the valve and simultaneously controlling the flow of water through the ports to control the mixed water temperature.

5. A thermostatically controlled mixing valve comprising hot and cold water ports, a mixed water outlet, a coil exposed to the flow of mixed water, a piston valve located between the hot and cold water ports and normally out of contact with both, the piston valve having an intercepting surface positioned at an angle to its direction of movement, a metallic bellows in communication with the coil, and connections between the bellows and piston valve for shifting the position of the valve to cause it to approach and recede from the ports simultaneously.

6. A mixing valve comprising open-ended ports designed for the delivery of fluid, and a valve member movable across the open ends of the ports and having intercepting surfaces inclined to the direction of movement and designed to approach one port and recede from the other port as the valve is moved transversely thereof.

7. A mixing valve comprising open-ended ports designed for the delivery of fluid, a valve member movable across the open ends of the ports and having intercepting surfaces inclined to the direction of movement and designed to approach one port and recede from the other port as the valve is moved transversely thereof, and thermostatic means connected with the valve and designed to traverse the valve across the ports, varying the flow therethrough in accordance with temperature changes.

8. A mixing valve comprising stationary fluid ports, a valve having inclined metering surfaces movable across the ports and designed to simultaneously approach one port and recede from the other port as the valve is moved thereacross, and parallelly disposed supporting arms oppositely connected to the valve to constrain movement thereof to an approximate straight-line path.

9. A mixing valve comprising oppositely disposed fluid ports, a piston type of valve having a generally cylindrical surface movable across the ports and normally spaced therefrom and designed to simultaneously approach one fluid port while receding from the other port, and parallel resilient arms oppositely connected to the valve to normally retain it in spaced relation to the ports and to constrain it to movement in a path inclined to the metering surface.

10. A mixing valve comprising oppositely disposed fluid ports, a piston type of valve having a generally cylindrical surface movable across the ports and normally spaced therefrom and designed to simultaneously approach one fluid port while receding from the other fluid port, parallel resilient arms oppositely connected to the valve to normally retain it in spaced relation to the ports and to constrain it to movement in a path inclined to the metering surface, and thermostatic means for actuating the valve in accordance with changes in temperature.

FRANK E. HAMILTON.

CERTIFICATE OF CORRECTION.

Patent No. 2,086,129.            July 6, 1937

FRANK E. HAMILTON.

It is hereby certified that error appears in the printed specification of the above numbered patent requiring correction as follows: Page 2, second column, line 59, claim 1, strike out the words "piston type" and insert the same before "valve", line 60, same claim; and that the said Letters Patent should be read with this correction therein that the same may conform to the record of the case in the Patent Office.

Signed and sealed this 31st day of August, A. D. 1937.

Leslie Frazer (Seal)                    Acting Commissioner of Patents.

tion inclined to its axis to cause movements of the valve to approach and recede from the ports, and means for confining the movement of the valve to an approximate straight-line path.

3. A mixing valve comprising a valve chamber having fluid ports therein, a piston valve movable in the chamber but normally out of contact therewith, means for guiding the movements of the valve in an approximate straight-line path inclined to its longitudinal axis, and means for moving the valve to cause it to approach and recede from the ports in the valve chamber.

4. A mixing valve comprising a valve chamber having hot and cold water ports, a piston valve having a contour corresponding to that of the chamber and with a surface inclined to its direction of movement, means for normally maintaining the valve out of contact with the walls of the valve chamber and for confining the movements of the valve to an approximate straight-line path, and thermostatically controlled means for shifting the position of the valve and simultaneously controlling the flow of water through the ports to control the mixed water temperature.

5. A thermostatically controlled mixing valve comprising hot and cold water ports, a mixed water outlet, a coil exposed to the flow of mixed water, a piston valve located between the hot and cold water ports and normally out of contact with both, the piston valve having an intercepting surface positioned at an angle to its direction of movement, a metallic bellows in communication with the coil, and connections between the bellows and piston valve for shifting the position of the valve to cause it to approach and recede from the ports simultaneously.

6. A mixing valve comprising open-ended ports designed for the delivery of fluid, and a valve member movable across the open ends of the ports and having intercepting surfaces inclined to the direction of movement and designed to approach one port and recede from the other port as the valve is moved transversely thereof.

7. A mixing valve comprising open-ended ports designed for the delivery of fluid, a valve member movable across the open ends of the ports and having intercepting surfaces inclined to the direction of movement and designed to approach one port and recede from the other port as the valve is moved transversely thereof, and thermostatic means connected with the valve and designed to traverse the valve across the ports, varying the flow therethrough in accordance with temperature changes.

8. A mixing valve comprising stationary fluid ports, a valve having inclined metering surfaces movable across the ports and designed to simultaneously approach one port and recede from the other port as the valve is moved thereacross, and parallelly disposed supporting arms oppositely connected to the valve to constrain movement thereof to an approximate straight-line path.

9. A mixing valve comprising oppositely disposed fluid ports, a piston type of valve having a generally cylindrical surface movable across the ports and normally spaced therefrom and designed to simultaneously approach one fluid port while receding from the other port, and parallel resilient arms oppositely connected to the valve to normally retain it in spaced relation to the ports and to constrain it to movement in a path inclined to the metering surface.

10. A mixing valve comprising oppositely disposed fluid ports, a piston type of valve having a generally cylindrical surface movable across the ports and normally spaced therefrom and designed to simultaneously approach one fluid port while receding from the other fluid port, parallel resilient arms oppositely connected to the valve to normally retain it in spaced relation to the ports and to constrain it to movement in a path inclined to the metering surface, and thermostatic means for actuating the valve in accordance with changes in temperature.

FRANK E. HAMILTON.

CERTIFICATE OF CORRECTION.

Patent No. 2,086,129.  July 6, 1937

FRANK E. HAMILTON.

It is hereby certified that error appears in the printed specification of the above numbered patent requiring correction as follows: Page 2, second column, line 59, claim 1, strike out the words "piston type" and insert the same before "valve", line 60, same claim; and that the said Letters Patent should be read with this correction therein that the same may conform to the record of the case in the Patent Office.

Signed and sealed this 31st day of August, A. D. 1937.

Leslie Frazer (Seal)  Acting Commissioner of Patents.

CERTIFICATE OF CORRECTION.

Patent No. 2,086,129.                                            July 6, 1937

FRANK E. HAMILTON.

It is hereby certified that error appears in the printed specification of the above numbered patent requiring correction as follows: Page 2, second column, line 59, claim 1, strike out the words "piston type" and insert the same before "valve", line 60, same claim; and that the said Letters Patent should be read with this correction therein that the same may conform to the record of the case in the Patent Office.

Signed and sealed this 31st day of August, A. D. 1937.

Leslie Frazer (Seal)                                        Acting Commissioner of Patents.